United States Patent [19]

Püntener

[11] Patent Number: 4,625,017
[45] Date of Patent: Nov. 25, 1986

[54] METAL COMPLEXES OF AZO DYES CONTAINING A 2-(P-N-ACELOACETYLAMINOPHENYL) BENZOTHIOZOLE MOIETY

[75] Inventor: Alois Püntener, Rheinfelden, Switzerland

[73] Assignee: Ciba-Geigy Corporation, Ardsley, N.Y.

[21] Appl. No.: 441,125

[22] Filed: Nov. 12, 1982

[30] Foreign Application Priority Data

Nov. 16, 1981 [CH] Switzerland .................. 7353/81

[51] Int. Cl.$^4$ ............... C09B 29/33; C09B 45/00; C09B 45/16; C09B 45/20
[52] U.S. Cl. ............................... 534/695; 534/696; 534/697; 534/698; 534/700; 534/602; 534/742; 548/152; 548/156
[58] Field of Search ............ 260/146 R, 147, 145 B; 534/700, 742, 695, 696, 697

[56] References Cited

U.S. PATENT DOCUMENTS

| 658,593 | 9/1900 | Scholl | 260/158 |
| 2,195,011 | 3/1940 | Petitcolas et al. | 534/742 X |
| 2,840,552 | 6/1958 | Sureau | 260/146 R |

FOREIGN PATENT DOCUMENTS

| 393722 | 4/1924 | Fed. Rep. of Germany | 534/742 |
| 723091 | 6/1942 | Fed. Rep. of Germany | 260/158 |
| 1054885 | 10/1953 | France | 534/700 |
| 516851 | 1/1940 | United Kingdom | 534/742 |
| 708681 | 2/1952 | United Kingdom | 260/158 |

OTHER PUBLICATIONS

Fierz-David et al., Fundamental Processes of Dye Chemistry, Interscience Publishers, Inc., NY, NY, 1949 (pp. 332–335).

Primary Examiner—Floyd D. Higel
Attorney, Agent, or Firm—Wenderoth, Lind & Ponack

[57] ABSTRACT

Metallizable azo dyes of the formula I

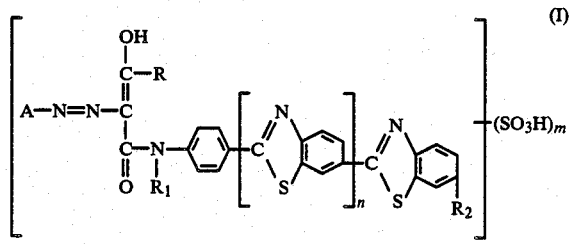

wherein
A is the radical of a diazo component of the benzene or naphthalene series, which diazo component contains in the o-position with respect to the azo group a metallizable hydroxyl group,
R is methyl or chloromethyl, or phenyl which can be substituted by $C_1$–$C_4$-alkyl, $C_1$–$C_4$-alkoxy or halogen,
$R_1$ is hydrogen or $C_1$–$C_4$-alkyl,
$R_2$ is hydrogen or methyl,
n is 0 or 1, and
m is 0, 1, 2 or 3.

In the form of their heavy-metal complexes, the dyes are suitable in particular for dyeing leather. These dyes are deeply colored, cover well, have good substantivity and build-up while simultaneously having good fastness properties.

8 Claims, No Drawings

METAL COMPLEXES OF AZO DYES CONTAINING A 2-(P-N-ACELOACETYLAMINOPHENYL) BENZOTHIOZOLE MOIETY

The present invention relates to metallisable azo dyes of the formula I

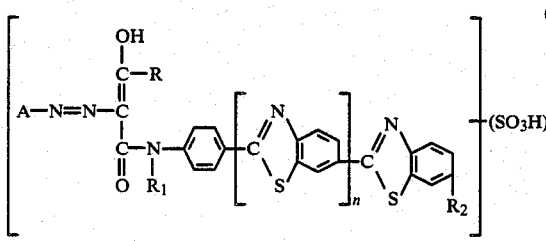

wherein
A is the radical of a diazo component of the benzene or naphthalene series, which diazo component contains in the o-position with respect to the azo group a metallisable hydroxyl group,
R is methyl or chloromethyl, or phenyl which can be substituted by $C_1$-$C_4$-alkyl, $C_1$-$C_4$-alkoxy or halogen,
$R_1$ is hydrogen or $C_1$-$C_4$-alkyl,
$R_2$ is hydrogen or methyl,
n is 0 or 1, and
m is 0, 1, 2 or 3,
and also to metal complexes thereof.

The radical A can contain one or more further substituents, for example low-molecular alkyl or alkoxy, chlorine, bromine, nitro, cyano, sulfo, alkylsulfonyl, such as methylsulfonyl, sulfamides, for example sulfamide or sulfomethylamide, or acylamido. By low-molecular alkyl or alkoxy groups are meant those having 1 to 6, preferably 1 to 2, C atoms; and "acylamino" denotes low-molecular alkanoylamino, alkylsulfonylamino and alkoxycarbonylamino groups, as well as sulfonylamino, aroylamino and arylsulfonylamino groups. Further possible substituents are the azobenzene group and the azonaphthalene group; and the aryl groups thereof can in their turn be substituted as described above.

The radical A is derived for example from the following amines:

2-amino-1-hydroxybenzene, 4-chloro- and 4,6-dichloro-2-amino-1-hydroxybenzene, 4- or 5-nitro-2-amino-1-hydroxybenzene, 4-chloro-, 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-sulfonamido-2-amino-1-hydroxybenzene, 1-hydroxy-2-aminobenzene-4-sulfoanthranilide, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 5-nitro- or 6-nitro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid, 2-amino-1-hydroxy-benzene-4,6-disulfonic acid, 4-hydroxy-3-amino-azobenzene, 4-hydroxy-3-amino-azobenzene-3'-sulfonic acid 4-hydroxy-3-aminobenzene-azonaphthalene or 6-sulfo-1-(3-amino-4-hydroxyphenylazo)-naphthalene.

Also suitable in place of the above-mentioned amines having a hydroxyl group are corresponding methoxy compounds or corresponding compounds of which the hydroxyl group has been tosylated, such as anisidine, 4- or 5-chloroanisidine, 4- or 5-nitroanisidine, anisidine-4- or -5-sulfonic acid, or tosylated 1-hydroxy-2-aminobenzene, the methoxy or O-tosyl group being converted during metallising into an OH group. Compounds having these groups are used in particular in cases where the corresponding 1-hydroxy-2-amino compounds do not readily couple.

In preferred dyes, A is the radical of a 1-hydroxy-2-aminobenzene, which radical is substituted by chlorine, nitro and/or sulfo, especially the radical of a 1-hydroxy-2-aminonitrobenzene, which optionally contains a sulfo group.

R is preferably methyl, $R_1$ is preferably hydrogen, and $R_2$ is preferably methyl.

The preferred meaning of n is zero; usually however the dyes of the formula I and metal complexes thereof do not exist in the pure form, but as mixtures of compounds, n being in some compounds nought and in other compounds 1. This is dependent on the synthesis, whereby customarily a starting material is dehydrothio-p-toluidine, which contains bis-dehydrothio-p-toluidine (primulin base) as a by-product.

The dyes of the formula I contain 0 to 3 sulfo groups which can be arranged at any positions of the molecule, preferably however they are arranged in the radical A and/or in the phenyl ring containing the radical $R_2$.

The preferred metallisable dyes according to the invention correspond to the formula II

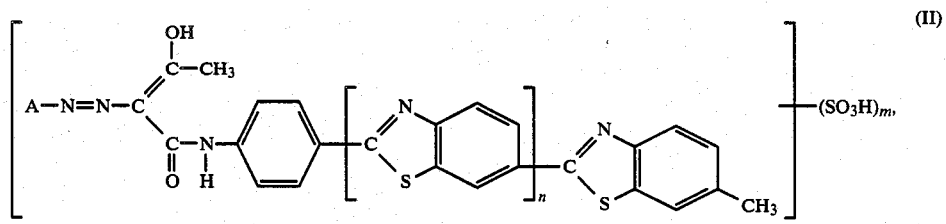

wherein
A is the radical of a 1-hydroxy-2-aminobenzene, which radical is substituted by chlorine, nitro and/or sulfo,
n is 0 or 1, and
m is 1 or 2.

The preferred subject matter of the present invention is formed by metal complex dyes containing at least one azo dye of the formula I given in the foregoing. Suitable metals are heavy metals, for example copper, iron and nickel, preferably however cobalt or chromium; and of particular interest are the 1:2-chromium or 1:2-cobalt complexes containing at least one dye of the formula I.

These metal complexes hence correspond to the formula III

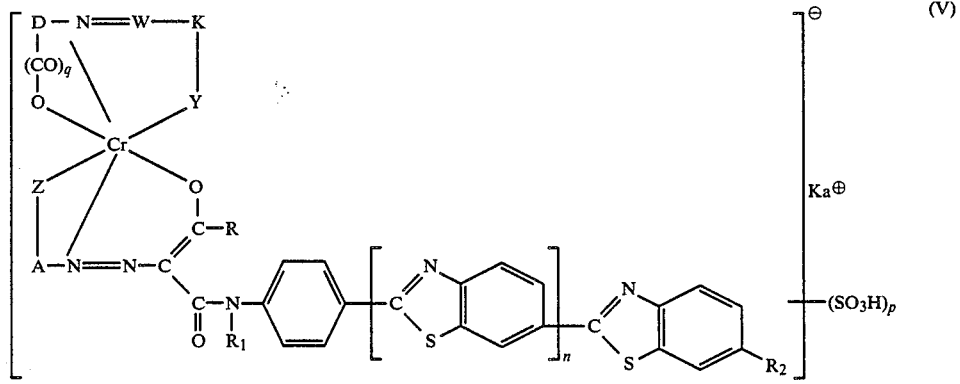

F₁—Me—F₂ (III)

wherein
F₁ is a metallisable azo dye of the formula I give above,
Me is cobalt or chromium, and
F₂ is a metallisable azo dye of the aforementioned formula I, which can be identical to F₁ or different from F₁, or it is any metallisable azo or azomethine dye.

A preferred group of metal complex dyes according to the invention are those of the formula IV

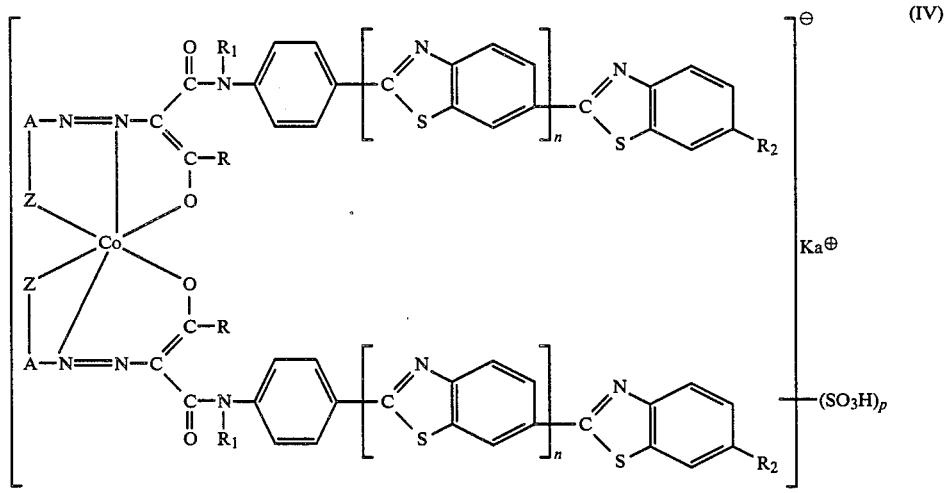

wherein the symbols A, R, R₁, R₂ and n have the meanings given under the formula I
Z is oxygen,
p is an integer between 0 and 6, and
Ka⊕ is a cation.

Particularly preferred among these compounds of the formula IV are those wherein
A is the radical of a 1-hydroxy-2-aminobenzene, which is substituted by chlorine, nitro and/or sulfo,
R is methyl,
R₁ is hydrogen,
R₂ is methyl,
Z is oxygen,
n is 1,
p is an integer between 0 and 6, and
Ka⊕ is a cation.

Also preferred are the metal complex dyes of the formula V (V)

wherein
the symbols A, R, R₁, R₂ and n have the meanings defined under the formula I,
Z is oxygen,
p is an integer between 0 and 6,
q is 0 or 1,
D is the radical of a diazo component of the benzene or naphthalene series, which radical contains the complex-forming hydroxyl or carboxyl group in the o-position with respect to the azo group,
W is a nitrogen atom or a CH group,
Y is an oxygen atom or an NH group, Y having to be oxygen when W is a CH group,
K is the radical of a coupling component coupling in the o-position with respect to the hydroxyl or NH group if W is a nitrogen atom, or it is the radical of an o-hydroxyaldehyde if W is the CH group, and
Ka⊕ is a cation.

Suitable groups A, R, R₁ and R² for the metal complex dyes of the formulae IV and V are the groups given for the azo dyes of the formula (I), and among these those mentioned as being preferred are also particularly suitable in the case of the metal complex dyes of the formulae IV and V.

The radical D is derived for example from amines which are the same as those listed in the foregoing for the radical A. Preferably, D is the radical of a 1-hydroxy-2-aminobenzene or 1-amino-2-hydroxynaphthalene, each further substituted by nitro and/or chlorine and/or sulfo.

The radical K is derived in particular from the following groups of coupling components: phenols, phenylenediamines, naphthols, naphthylamines, pyrazolones, pyrazoleimines, pyridones, hydroxyquinolines or acetoacetic acid amides, especially -anilides. These can carry a further one or more substituents, for example those mentioned above for the radical A.

Preferred coupling components K are the following: phenols which are unsubstituted or substituted by low-molecular alkyl or alkoxy, amino or acylamino, whereby acylamino has the meaning given above, recorcinol, m-phenylenediamine, unsubstituted or substituted in the 4-position by sulfo, chlorine, methyl or methoxy, or naphthols which are unsubstituted or substituted by low-molecular alkyl or alkoxy, chlorine, acylamino or sulfo, where acylamino has the same meaning as that given in the foregoing, 5-pyrazolones or 5-aminopyrazoles, which contain in the 1-position a phenyl or naphthyl group, unsubstituted or substituted by chlorine, nitro, low-molecular alkyl or alkoxy groups or sulfo groups, and which have in the 3-position a $C_1$–$C_4$-alkyl or carboxy group, particularly a methyl group, or naphthylamines which are unsubstituted or substituted by sulfo, sulfonamido or sulfone groups, or acetoacetic acid anilides and benzoylacetic acid anilides, which are unsubstituted or can be substituted in the anilide nucleous by chlorine, bromine, nitro, low-molecular alkyl, alkoxy or sulfo groups, or 6-hydroxy-3-cyano- or 6-hydroxy-3-carbonamido-4-alkyl-2-pyridones, which are substituted in the 1-position by low-molecular, unsubstituted or substituted alkyl, for example methyl, isopropyl, β-hydroxyethyl, β-aminoethyl or γ-isopropoxypropyl, or by phenyl, and which can contain in the 4-position a low-molecular alkyl group, especially methyl; or hydroxyquinolines.

Examples of coupling components of this type are: 2-naphthol, 1,3- or 1,5-dihydroxynaphthalene, 1-naphthol, 1-acetylamino-7-naphthol, 1-propionylamino-7-naphthol, 1-carbomethoxyamino-7-naphthol, 1-carboethoxyamino-7-naphthol, 1-carbopropoxyamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 4-methyl-1-naphthol, 4-methoxy-1-naphthol, 4-acetyl-1-naphthol, 5,8-dichloro-1-naphthol, 5-chloro-1-naphthol, 2-naphtylamine, 2-naphthylamino-1-sulfonic acid, 1-naphthylamino-4- or -5-sulfonic acid, 2-aminonaphthalene-6-sulfonic acid, 2-aminonaphthalene-5-sulfonic acid, 6-methylsulfonyl-2-aminonaphthalene, 1-phenyl-3-methylpyrazol-5-one, 1-phenyl-5-pyrazolone-3-carboxylic acid amide, 1-(2'-, 3'- or 4'-methylphenyl)-3-methylpyrazol-5-one, 1-(2',3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2',5'- or 3',4'-dichlorophenyl)-3-methylpyrazol-5-one, 1-(2',5'-dichloro-4'-sulfophenyl)-3-methylpyrazol-5-one, 1-(2',3'- or 4'-sulfophenyl)-3-methyl-5-aminopyrazole 1-phenyl-3-methyl-5-aminopyrazole, 1-(2'-chloro-5'-sulfophenyl)-3-methyl-5-aminopyrazole, acetoacetanilide, acetoacetanilide-4-sulfonic acid, acetoaceto-o-anisidide, acetoaceto-o-toluidide, acetoaceto-o-chloroanilide, acetoaceto-m-xylidide, tetralol, 4-methylphenol, 3-dialkylaminophenols, particularly 3-dimethylamino- and 3-diethylaminophenol, 4-butylphenol, preferably 4-tert-butylphenol, 4-amylphenol, especially 4-t-amylphenol, 2-isopropyl-4-methylphenol, 2- or 3-acetylamino-4-methylphenol, 2-methoxycarbonylamino-4-methylphenol, 2-ethoxycarbonylamino-4-methylphenol and 3,4-dimethylphenol, resorcinol, 1-methyl-3-cyano-4-ethyl-6-hydroxypyridone, 1-methyl-3-cyano-4-methyl-6-hydroxypyridone, 1-phenyl-3-carbonamido-4-methyl-6-hydroxypyridone, 2,4-dihydroxyquinoline and 1-ethyl-4-hydroxy-2-quinoline.

The coupling component K is preferably 1- or 2-naphthol which is unsubstituted or substituted by amino and/or sulfo, or it is 1- or 2-naphthylamine which is unsubstituted or substituted by sulfo, or it is p-alkyl-($C_1$–$C_6$)-phenol, 1-phenyl-3-methyl-5-pyrazolone or acetoacetic acid anilide, and the phenyl group in the two last-mentioned compounds can be substituted by $C_1$–$C_4$-alkyl, $C_1$–$C_4$-alkoxy, chlorine or sulfo.

Particularly suitable among the metal complex dyes of the formula V are those wherein A is the radical of a 1-hydroxy-2-aminobenzene, which is substituted by chlorine, nitro and/or sulfo, R is methyl, $R_1$ is hydrogen, $R_2$ is methyl, Z is oxygen, and n is 1, and D, W, K, Y, q, p and Ka$^\oplus$ have the meanings defined under the formula V.

Also preferred are the dyes of the formula V wherein D is the radical of a 1-hydroxy-2-aminobenzene or 1-amino-2-hydroxynaphthalene, each further substituted by nitro, chlorine and/or sulfo, and K is a 1- or 2-naphthol which is unsubstituted or substituted by amino and/or sulfo, or 1- or 2-naphthylamine which is unsubstituted or substituted by sulfo, or it is p-alkyl-($C_1$–$C_6$)-phenol, 1-phenyl-3-methyl-5-pyrazolone or acetoacetic acid anilide, and the phenyl group in the two last-mentioned compounds can be substituted by $C_1$–$C_4$-alkyl, $C_1$–$C_4$-alkoxy, chlorine or sulfo.

When W is a CH group, K is the radical of an o-hydroxyaldehyde, preferably the radical of an unsubstituted or substituted o-hydroxybenzaldehyde or o-hydroxynaphthaldehyde. Suitable aldehydes are for example: 2-hydroxy-1-naphthaldehyde, 1-hydroxy-2-naphthaldehyde, 2-hydroxybenzaldehyde, 3- and 5-methyl-2-hydroxybenzaldehyde, 3,5-dimethyl-2-hydroxybenzaldehyde, 5-butyl-2-hydroxybenzaldehyde, 5-chloro- or 5-bromo-2-hydroxybenzaldehyde, 3-chloro-2-hydroxybenzaldehyde, 3,5-dichloro-2-hydroxybenzaldehyde, 5-sulfo-2-hydroxybenzaldehyde or 3-methyl-5-chloro-2-hydroxybenzaldehyde, as well as the aldehydes substituted by arylazo, which can be derived therefrom.

The radicals D and/or K can contain further arylazo groups, so that D—N=W—K can be also disazo dyes or azomethine-azo dyes. Dyes of the formula D—N=N—K are in particular the known metallisable dyes, for example those which are listed as mordant dyes in the Colour Index.

The metal-free azo dyes of the formula I are obtained by methods known per se, for example by coupling a compound of the formula VI

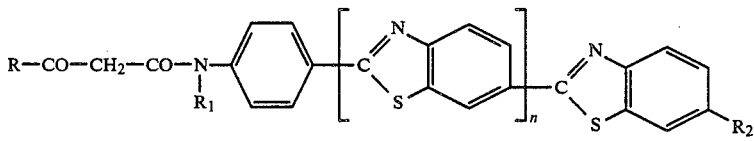

with a diazonium compound of an amine of the formula A—NH$_2$, the two compounds containing in all 0 to 3 sulfo groups, and R, R$_1$, R$_2$, n and A having the meanings defined in the foregoing.

The compounds of the formula VI are known, and can be produced for example by reaction of diketene with dehydrothiotoluidine.

The metal complex dyes containing at least one azo dye of the formula I are produced, for example, by reacting an azo dye of the formula I, or a mixture of an azo dye of the formula I and a second azo dye of the formula I and/or another azo or azomethine dye, with an agent releasing metal, particularly cobalt or chromium. The metallising is performed by the customary processes, for example with copper sulfate, iron chloride, cobalt sulfate or cobalt acetate, or chromium salicylate, in a slightly alkaline, neutral or slightly acidic solution.

Chroming can also be performed with chromates in the presence of a reducing agent. The azo dyes are reacted with the metallising agents in the ratio of 1:1 or 1:2, the reaction being performed under the conditions customary for metallising. Metallising can be carried out in aqueous, organic-aqueous or purely organic solvents, such as alcohols or ketones, if necessary with the addition of solubilisers, or substances accelerating metallising, for example complexing agents.

It is also possible to react a mixture of azo dyes with the metallising agents, and to thus produce directly mixtures of various metal complex dyes. In the case of 1:2 metal complexes, there are formed, in addition to the 1:2 complexes containing two identical azo dyes, also so-called unsymmetrical 1:2 complexes containing two different azo dyes.

In the case of the chromium complexes, the azo dye of the formula I can also be reacted with a 1:1-chromium complex to give the 1:2-chromium complex dye, thus obtaining homogeneous, unsymmetrical 1:2 complexes.

Finally, it is also possible to react an azo dye of the formula I, optionally in admixture with a second azo dye of the formula I and/or other azo or azomethine dyes, simultaneously with two different metallising agents, so that mixtures of complex dyes of different metals are obtained directly.

The metal-free azo dyes of the formula (I) are suitable for dyeing or printing wool and cotton, the procedure being such that the dyeing on the fibres is aftertreated by means of metal-releasing agents, preferably copper-, chromium- or cobalt-releasing agents.

The novel metal complex dyes obtainable by the above processes are advantageously isolated in the form of their salts, particularly alkali metal salts, such as lithium or potassium salts, in particular however sodium salts, and also ammonium salts. They are suitable for dyeing the widest variety of natural or synthetic materials containing nitrogen and hydroxyl groups, such as polyamides, wool, cotton and paper, or polyurethanes, especially however for dyeing leather.

The metal complex dyes of the formula III which contain 1 or 2 sulfo groups are preferably isolated as amine salts. They are suitable for example for spraying leather, or for dyeing organic liquids, lacquers and polymers.

The novel dyes are deeply coloured and cover well. They have good substantivity with simultaneously good fastness properties, such as fastness to washing, water, perspiration, rubbing, diffusion, light, acids and alkalies, as well as good stability to acids and alkalies. Worthy of particular mention are the good build-up properties on various types of leather, both on leather tanned only with chromium salts, and on leather retanned with vegetable or synthetic tanning agents. Full yellow, orange-red to brown or olive shades are obtained.

Except where otherwise stated in the following Examples, 'parts' are parts by weight, percentages are percent by weight, and the temperature values are in degrees Centigrade.

EXAMPLE 1

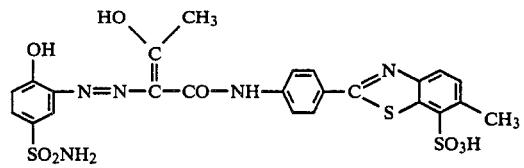

25.0 parts of 31% hydrochloric acid are added to 18.8 parts of 4-sulfonamido-2-amino-1-hydroxybenzene in 400 parts of water and 100 parts of ice, and the mixture is diazotised at 0°–5° C. by the addition of 25.0 parts of 4N sodium nitrite solution; and the diazotised product is coupled in the customary manner, at pH 7–8 by means of sodium hydroxide solution and at room temperature, to 40.4 parts of 6-methyl-2-(p-N-acetoacetylaminophenyl)benzothiazole-7-sulfonic acid (N-acetoacetyl-dehydrothio-p-toluidine-7-sulfonic acid) in 400 parts of water. The dye obtained is salted out with 75 parts of sodium chloride, filtered off and dried.

The dye, dyed in the usual manner onto cotton, and reacted with copper sulfate on the fibres to give the 1:1 complex, produces a yellow dyeing having good fastness properties.

EXAMPLE 2

500 parts of water are added to the non-metallised dye obtained according to Example 1, and this is then metallised at 60° C. with 16 parts of copper sulfate, the pH value being maintained at 6 by means of sodium hydroxide solution. The 1:1 copper complex obtained is subsequently precipitated with 50 parts of sodium chloride, filtered off and dried.

A dyeing on cotton corresponds largely to the dyeing obtained in Example 1.

By using in place of copper sulfate the equivalent amount of nickel acetate, there is obtained the corresponding 1:1 nickel complex, which is similar to the copper complex in shade and properties.

These dyes are suitable also for dyeing paper.

The analogous 1:1 chromium complex is obtained with the equivalent amount of chromium trichloride in a strongly acid medium. Wool can be dyed in a yellow shade with this dye.

All these dyes are suitable also for dyeing polyamide and leather.

EXAMPLES 3–7

Dyes having similar properties are obtained by reacting the azo dyes listed in column 2 of the following Table to obtain the copper complex in the manner described above. The dyes obtained dye cotton in the shades given in column 3.

| No. | Azo dye | Colour on cotton |
|---|---|---|
| 3 | 2-hydroxy-5-sulfo-phenyl–N=N–C(OH)(CH$_3$)=C–CO–NH–phenyl–benzothiazole-CH$_3$,SO$_3$H | yellow |
| 4 | 3-nitro-2-hydroxy-5-sulfo-phenyl–N=N–C(OH)(CH$_3$)=C–CO–NH–phenyl–benzothiazole-CH$_3$,SO$_3$H | orange |
| 5 | 3-sulfo-2-hydroxy-5-sulfo-phenyl–N=N–C(OH)(CH$_3$)=C–CO–NH–phenyl–benzothiazole-CH$_3$,SO$_3$H | yellow |
| 6 | 3-sulfo-2-hydroxy-5-chloro-phenyl–N=N–C(OH)(CH$_3$)=C–CO–NH–phenyl–benzothiazole-CH$_3$,SO$_3$H | yellow |
| 7 | 3-sulfo-2-hydroxy-5-sulfo-phenyl–N=N–C(OH)(CH$_3$)=C–CO–NH–phenyl–benzothiazole-CH$_3$ | yellow |

EXAMPLE 8

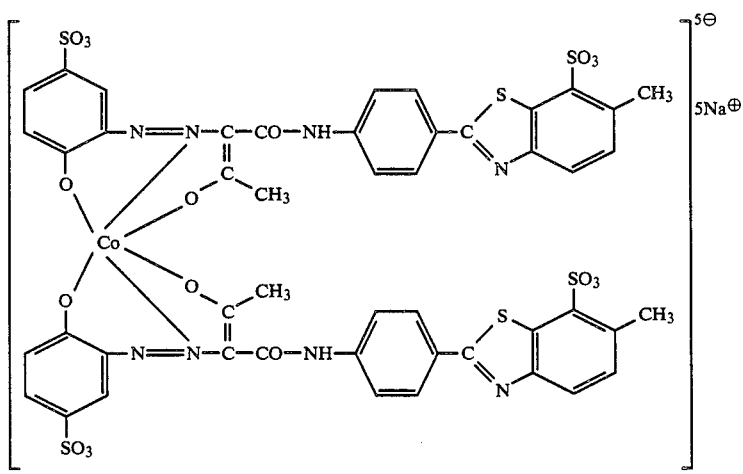

60.4 parts of the monoazo dye, obtained from diazotised 2-aminophenol-4-sulfonic acid and 6-methyl-2-(p-N-acetoacetylaminophenyl)-benzothiazole-7-sulfonic acid (N-acetoacetyldehydrothio-p-toluidine-7-sulfonic acid), are introduced into 500 parts of water, and 60 parts of a 1 molar cobalt sulfate solution are added. The reaction mixture is heated to 80° C., and is maintained at a pH value of 6 to 9 by the dropwise addition of 2 molar sodium hydroxide solution. After metallising is completed, the cobalt-containing dye is precipitated by the addition of sodium chloride. The dye obtained dyes leather in a medium to dark yellow shade having good fastness properties.

EXAMPLE 9 TO 23

Dyes having similar properties are obtained by converting the azo dye obtained from the diazo component listed in column 2 of the following Table and the coupling component given in column 3, in the manner described in the foregoing, into the 1:2 metal complex of the metal shown in column 4. The resulting dye dyes leather in the shade given in column 5.

| No. | Diazo component | Coupling component | Metal | Colour on leather |
|---|---|---|---|---|
| 9 | ![structure with OH, NH2, SO2NH, COOH] | ![structure with H3C, SO3H, benzothiazole, NH-CO-CH2-CO-CH3] | Cr | reddish-yellow |
| 10 | " | " | Co | yellow |
| 11 | ![structure with OH, NH2, HO3S, NO2] | " | Cr | red |
| 12 | " | " | Co | brown |
| 13 | ![structure with NH2, HO, SO3H] | " | Cr | yellow |

-continued

| No. | Diazo component | Coupling component | Metal | Colour on leather |
|---|---|---|---|---|
| 14 | 2-amino-4-sulfamoylphenol (OH, NH$_2$, SO$_2$NH$_2$) | " | Co | yellow |
| 15 | " | " | Cr | reddish-yellow |
| 16 | 3-amino-2-hydroxy-5-nitrobenzenesulfonic acid (HO$_3$S, OH, NH$_2$, NO$_2$) | " | Co | yellow |
| 17 | 3-amino-2-hydroxy-5-sulfo-nitrobenzene (O$_2$N, OH, NH$_2$, SO$_3$H) | " | Co | orange |
| 18 | 3-amino-2-hydroxybenzene-1,5-disulfonic acid (HO$_3$S, OH, NH$_2$, SO$_3$H) | " | Co | yellow |
| 19 | 3-amino-5-chloro-2-hydroxybenzenesulfonic acid (HO$_3$S, OH, NH$_2$, Cl) | " | Co | yellow |
| 20 | " | " | Fe | medium brown |
| 21 | 2-amino-4-nitrophenol (OH, NH$_2$, NO$_2$) | " | Co | yellow |
| 22 | " | H$_3$C-benzothiazole-phenyl-NH-C(O)-CH$_2$-C(O)-CH$_3$ | Co | yellow |
| 23 | 3-amino-2-hydroxybenzene-1,5-disulfonic acid (HO$_3$S, OH, NH$_2$, SO$_3$H) | " | Co | yellow |

EXAMPLE 24

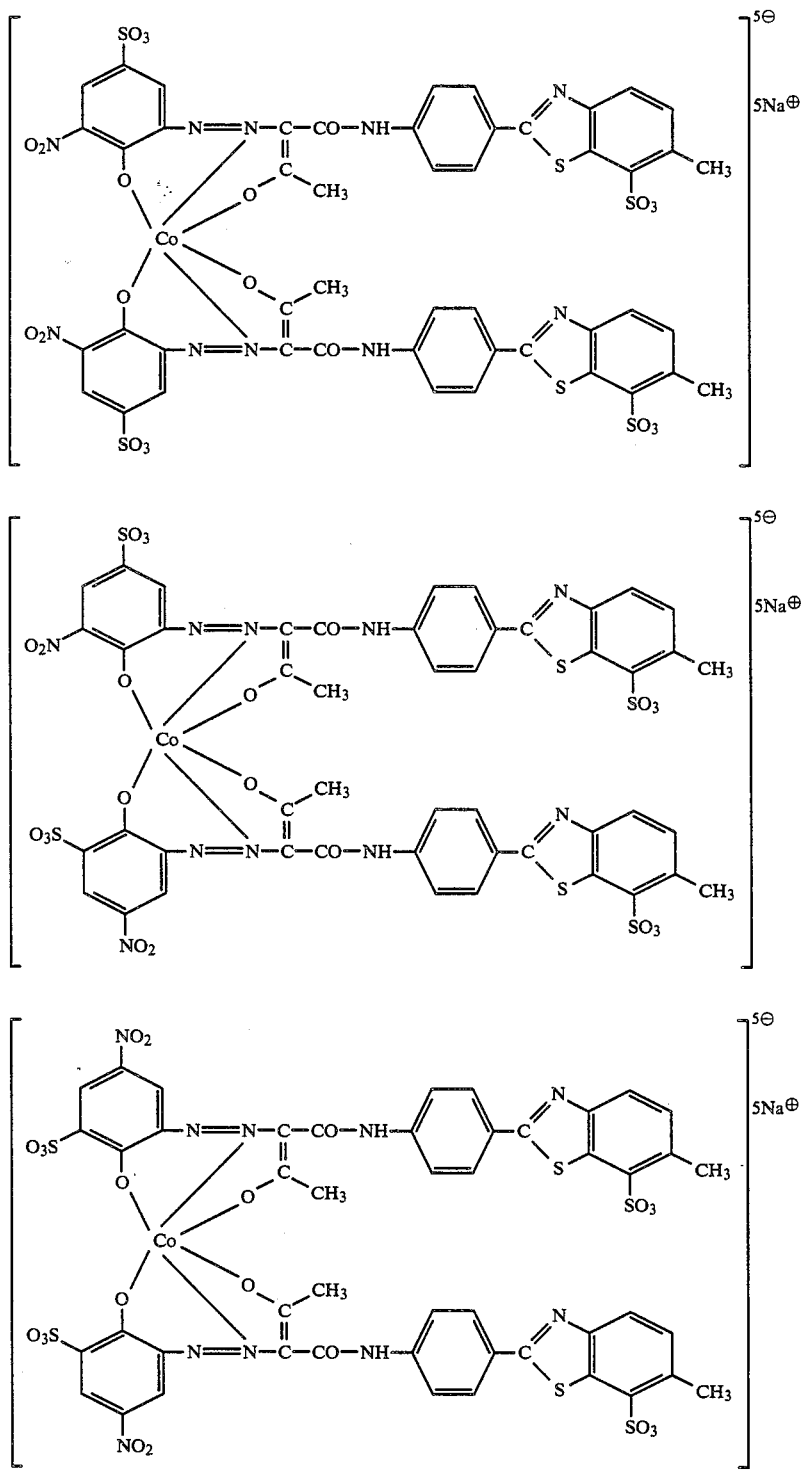

32.4 parts of the monoazo dye obtained from diazotised 2-amino-4-nitro-phenol-6-sulfonic acid and N-acetoacetyldehydrothio-ptoluidine-7-sulfonic acid, as well as 32.4 parts of the monoazo dye produced analogously from diazotised 2-amino-6-nitro-phenol-4-sulfonic acid and N-acetoacetyldehydrothio-p-toluidine-7-sulfonic acid, are introduced into 500 parts by volume of water, and are metallised at 80° C. with 60 parts by volume of a 1 molar cobalt sulfate solution, the pH value being held at 6 to 9. The dye mixture of the given formulae is precipitated with sodium chloride, filtered off and dried to thus obtain a yellowish-brown powder which dyes leather in a yellowish-brown shade having good fastness properties.

EXAMPLE 25

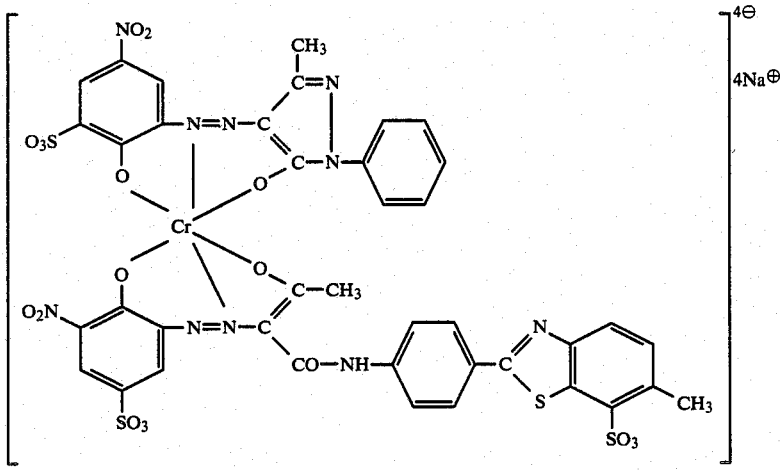

The complex 1:1 chromium compound which contains 21 parts of the dye from diazotised 2-amino-4-nitro-phenol-6-sulfonic acid and 1-phenyl-3-methyl-pyrazol-5-one, as well as 2.6 parts of chromium, is introduced into 500 parts of water, and there are then added 32.4 parts of the monoazo dye formed from diazotised 2-amino-6-nitro-phenol-4-sulfonic acid and N-acetoacetyl-dehydrothio-p-toluidine-7-sulfonic acid. The pH-value of the reaction mixture is maintained, with vigorous stirring, at 6 to 8 with sodium hydroxide solution until the formation of the 1:2 metal complex is completed, the temperature having been kept at 70° to 90° C. during the process. The dye is subsequently precipitated with sodium chloride, filtered off and dried. It dyes leather in an orange shade having good fastness properties.

EXAMPLES 26 TO 34

Dyes having similar properties are obtained by reacting the 1:1 chromium complex of the azo or azomethine dye listed in column 3 of the following Table with the azo dye given in column 2, in the manner described in the foregoing, to form the 1:2 chromium complex. The dyes obtained dye leather in the shades shown in column 4.

| No. | Azo dye formed from N—acetoacetyl-dehydrothio-p-toluidine-7-sulfonic acid derivative | Azo or azomethine dye | Colour on leather |
|---|---|---|---|
| 26 | [structure] | [structure] | orange-brown |
| 27 | " | [structure] | orange-brown |
| 28 | " | [structure] | brown |
| 29 | [structure] | [structure] | brown |

| No. | Azo dye formed from N—acetoacetyl-dehydro-thio-p-toluidine-7-sulfonic acid derivative | Azo or azomethine dye | Colour on leather |
|---|---|---|---|
| 30 | | | olive-green |
| 31 | " | | brown |
| 32 | | | dark brown |
| 33 | | | brown |
| 34 | | | dark brown |

Dyeing instructions for leather 100 parts of neutralised, chrome-tanned, cow-hide are dyed with 1.0 part of the dye of the Example 28 in 500 parts of water at 50° C. To the dye liquor are added after 30 minutes 3 parts of a synthetic fat-liquoring agent (mixture of alkylbenzenes, aliphatic hydrocarbons, alkanesulfonic acids and tensides), and after a further 30 minutes there is added 0.5 part of 85% formic acid diluted with 5 parts of water. The leather is rinsed after 20 minutes with water, and the dyeing is finished in the customary manner. A brown dyeing having good fastness properties is obtained.

Spraying instructions for leather 3 parts of the dye of the Table Example 13 are dissolved in a solvent mixture consisting of 80 parts of dimethylformamide and 17 parts of diethylene glycol. This dye solution is then sprayed with a spray gun onto leather, and the leather is subsequently dried. A yellow dyeing having good fastness properties is obtained.

Dyeing instructions for paper 10.0 parts of moist, bleached cellulose are suspended in 500 parts of water, and dyed at room temperature with 0.1 part of the dye of Example 3; it is then filtered off, and finished in the usual manner. Paper dyed in a yellow shade and having good fastness to light is obtained.

Dyeing instructions for polyamide 100 parts of polyamide knitting yarn are introduced into a dye bath at 50° C., which contains, to 4000 parts of water, 2 parts of the dye of Example 32, 4 parts of ammonium sulfate and 2 parts of a levelling agent. The liquor is brought to boiling in the course of 45 minutes, and is kept for a further 45 minutes at boiling temperature. The dyed material is subsequently removed from the bath, thoroughly rinsed with cold water and afterwards dried. A khaki-coloured polyamide having good fastness properties is obtained.

What is claimed is:

1. A heavy metal complex dye containing one dye of the formula

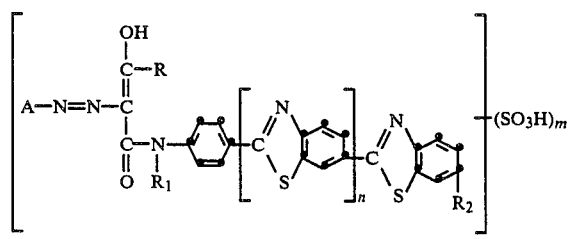

wherein
A is the radical of a diazo compound of a benzene or naphthalene, which diazo compound contains in the o-position with respect to the azo group a metallizable hydroxyl group, wherein the radical A is unsubstituted or substituted by low-molecular alkyl, low-molecular alkoxy, chlorine, bromine, nitro, cyano, sulfo, alkysulfonyl, sulfamoyl, methyl sulfamoyl, low-molecular alkanoylamino, low-molecular alkylsulfonylamino, low-molecular alkoxycarbonylamino, sulfonylamino, aroylamino, arylsulfonylamino, azobenzene or azonaphthalene, and the aryl groups of the azobenzene and the azonaphthalene are unsubstituted or substituted with any substituent listed above for A, R is methyl, chloromethyl, phenyl $C_1$–$C_4$-alkylphenyl, $C_1$–$C_4$-alkoxyphenyl or halophenyl,
$R_1$ is hydrogen or $C_1$–$C_4$-alkyl,
$R_2$ is hydrogen or methyl,
n is 0 or 1, and
m is 0, 1, 2 or 3.

2. A metal-complex dye of claim 1, wherein the metal is copper, iron, cobalt or chromium.

3. A metal-complex dye of claim 1 of the formula $$F_1\text{—}Me\text{—}F_2$$

wherein
$F_1$ is a metallizable azo dye of claim 1,
Me is cobalt or chromium, and
$F_2$ is metallizable azo or azomethine dye.

4. A metal-complex dye of claim 1 of the formula

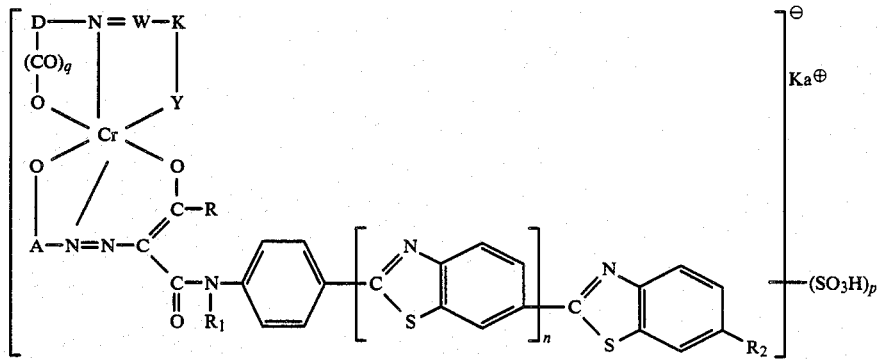

wherein
P is an integer between 0 and 6, and
$Ka^\oplus$ is a cation.

5. A metal-complex dye of claim 4, wherein
A is the radical of a 1-hydroxy-2-aminobenzene, which radical is substituted by one or more of chlorine, nitro and sulfo,
R is methyl,
$R_1$ is hydrogen,
$R_2$ is methyl, and
n is 1.

6. A metal-complex dye of claim 1 of the formula

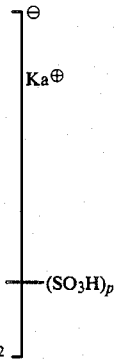

wherein
p is an integer between 0 and 6,
q is 0 or 1,
D is the radical of a diazo component of the benzene or naphthalene series, which radical contains the complex-forming hydroxyl or carboxyl group in the o-position with respect to the azo group,
W is a nitrogen atom or a CH group,
Y is an oxygen atom or an NH group, provided that Y is oxygen when W is a CH group,
K is the radical of a coupling component coupling in the o-position with respect to the hydroxyl or NH group when W is a nitrogen atom, or it is the radical of an o-hydroxyaldehyde when W is the CH group, and
$Ka^\oplus$ is a cation.

7. A metal-complex dye of claim 6, wherein A is the radical of a 1-hydroxy-2-aminobenzene, which radical is substituted by one or more of chlorine, nitro and sulfo,

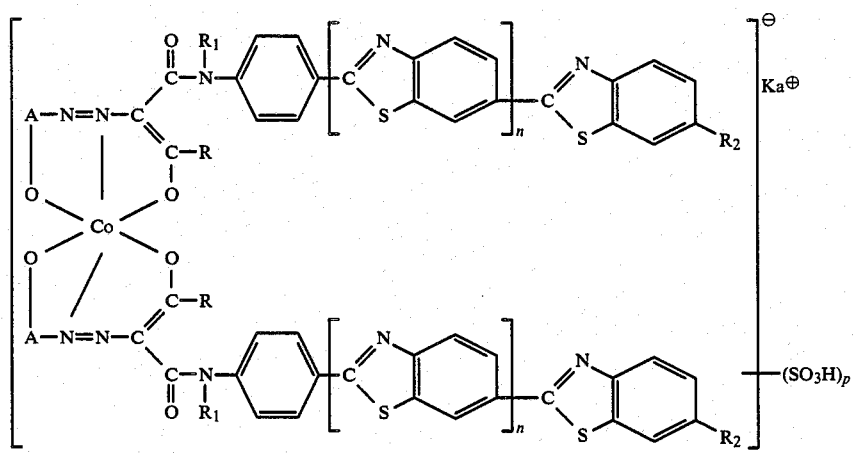

R is methyl, $R_1$ is hydrogen, $R_2$ is methyl, Z is oxygen, and n is 1.

8. A metal-complex dye of claim 6, wherein D is the radical of a 1-hydroxy-2-aminobenzene or 1-amino-2-hydroxynaphthalene, each further substituted by one or more of nitro, chlorine and sulfo, and K is 1- or 2-naphthol which is unsubstituted or substituted by one or more of amino and sulfo; 1- or 2-naphthylamine which is unsubstituted or substituted by sulfo; p-alkyl-$(C_1-C_6)$-phenol; 1-phenyl-3-methyl-5-pyrazolone; or acetoacetic acid anilide, and the phenyl group in the two last-mentioned compounds is unsubstituted or substituted by $C_1-C_4$-alkyl, $C_1-C_4$-alkoxy, chlorine or sulfo.

* * * * *